United States Patent
Schupfner

(10) Patent No.: US 6,188,959 B1
(45) Date of Patent: Feb. 13, 2001

(54) NAVIGATION DEVICE AND METHOD FOR POSITION DETERMINATION BY MEANS OF DEAD RECKONING

(75) Inventor: Markus Schupfner, Regensburg (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/408,684

(22) Filed: Sep. 30, 1999

Related U.S. Application Data

(63) Continuation of application No. PCT/DE99/00153, filed on Jan. 21, 1999.

(30) Foreign Application Priority Data

Jan. 30, 1998 (DE) .............................. 198 03 662

(51) Int. Cl.⁷ .................................. G06F 15/00
(52) U.S. Cl. .......................... 701/217; 342/357.14
(58) Field of Search ............................ 701/210, 216, 701/217; 342/357.14; 73/178 R; 702/92, 93, 94

(56) References Cited

U.S. PATENT DOCUMENTS

| | | | |
|---|---|---|---|
| 4,758,959 | * 7/1988 | Thoone et al. | 701/221 |
| 4,796,191 | * 1/1989 | Honey et al. | 701/217 |
| 4,819,175 | * 4/1989 | Wuttke | 701/208 |
| 5,159,556 | 10/1992 | Schorter | 342/357.14 |
| 5,170,165 | * 12/1992 | Iihoshi et al. | 340/995 |
| 5,311,195 | 5/1994 | Mathis et al. | 701/210 |
| 5,394,333 | 2/1995 | Kao | 701/217 |
| 5,774,824 | * 6/1998 | Streit et al. | 701/207 |
| 5,839,087 | * 11/1998 | Sato | 701/207 |
| 6,002,981 | * 12/1999 | Kreft | 701/210 |

FOREIGN PATENT DOCUMENTS

| | | |
|---|---|---|
| 3519277A1 | 12/1986 | (DE) . |
| 4211933A1 | 10/1993 | (DE) . |

OTHER PUBLICATIONS

Published International Application No. 93/09509 (Seymour et al.), dated May 13, 1993.

\* cited by examiner

*Primary Examiner*—William A. Cuchlinski, Jr.
*Assistant Examiner*—Eric M Gibson
(74) *Attorney, Agent, or Firm*—Herbert L. Lerner; Laurence A. Greenberg; Werner H. Stemer

(57) ABSTRACT

The navigation device and the corresponding method for position determination utilize dead reckoning. A position is calculated by a processor on the basis of measured values from a distance sensor and a direction sensor. The measured values are compared with a probable position on a stored digital road map. The deviation between the calculated position and the corresponding position on the digitized road map can be saved. Saved deviations form the basis of a correction value with which the calculated position can be corrected.

11 Claims, 2 Drawing Sheets

NAVIGATION DEVICE AND METHOD FOR POSITION DETERMINATION BY MEANS OF DEAD RECKONING

CROSS-REFERENCE TO RELATED APPLICATION

This is a continuation of copending International Application PCT/DE99/00153, filed Jan. 21, 1999, which designated the United Sates.

BACKGROUND OF THE INVENTION

Field of the Invention

The invention concerns a navigation device and a method for position determination by means of dead reckoning, in particular for motor vehicles, in which measured values for distances traveled and directions are summed. A position calculated in this way is compared with a probable position on a digitized road map and corrected. The process is called map matching.

German published patent application DE 35 19 277 A1 discloses a navigation method for vehicles which is based on dead reckoning. On reaching a final destination the user can determine the difference between the calculated position and the actual location by pressing a button. This is used to determine correction values for the measurement of the direction and for the measurement of the distance traveled. These correction values can be used to correct inherent, constant errors in the measurement of direction and distance.

International patent application WO 93/09509 discloses a sensor system for vehicle navigation in which an error component of a sensor is determined in order to recalibrate the sensor.

U.S. Pat. No. 5,394,333 describes a hybrid vehicle navigation system with GPS and dead reckoning. A position calculated using dead reckoning is drawn on a road map. The difference between the position on the road map and a position found using GPS is used to determine a correction value for the GPS navigation system.

From German published patent application DE 42 11 933 A1 there is known a navigation device for dead reckoning which produces correction values for a GPS receiver. A correction value is derived by comparing a position calculated by dead reckoning with a road position coordinate read from a mass memory device. This correction value is fed to the GPS receiver in order to adjust the position data acquired via satellite reception. Digitalization errors in the roads stored in mass memory are integrated unfiltered in the correction value.

From German published patent application DE 35 19 277 there is known a navigation method for vehicles with a dead reckoning device in which on reaching a destination a correction value is derived through determination of the difference between the destination entered and the location calculated by dead reckoning.

SUMMARY OF THE INVENTION

It is accordingly an object of the invention to provide a navigation device and a method for position determination by means of dead reckoning, which overcomes the above-mentioned disadvantages of the heretofore-known devices and methods of this general type and which allow exact position determination using dead reckoning even if a variable error occurs between the calculated positions and the probable positions.

With the foregoing and other objects in view there is provided, in accordance with the invention, a navigation device for dead reckoning, comprising:

an input for receiving a distance signal from a sensor for determining a distance;

an input for receiving a direction signal from a sensor for determining a direction;

a processor for position calculation based on the distance signal and the direction signal received from the sensors;

a memory device connected to the processor and having stored therein a digitized road map for comparison with a calculated position;

a memory connected to the processor for storing a sequence of deviations between each of a series of calculated positions and a corresponding position on the digitized road map;

the processor being programmed to correct a calculated position using a correction value derived on a basis of saved deviations; and to save a sequence of deviations for deriving a correction value in the memory until a new deviation to be saved lies outside a defined limit.

In other words, the error between a position calculated by dead reckoning (sensor position) and a probable position on a road map corresponding with this, is saved in memory. From a sequence of errors or deviations, a specific error pattern is derived and used for correcting the position calculated by dead reckoning. The error pattern is not used for making a correction at the level of a direction sensor or distance sensor in order to provide a correction value for the measured angle or distance respectively. According to the invention, a correction takes place at the processor level and not at the sensor level.

In doing this, the corresponding digitized road map position used for deriving the correction value does not have to be a position already evaluated as certain through map matching. It is also possible simply to use the (tracking) position followed on the digitized road map, for which position the degree of certainty that it is the actual position is not high enough for it to be used for dead reckoning navigation.

During the simultaneous tracking on the digitized road map of several paths on which the actual position of the navigation device or a vehicle equipped therewith could be located, several (possible) positions on the digitized road map can correspond with the position calculated by dead reckoning. Of all the possible positions, the one most suitable for determining the difference from the position calculated by dead reckoning is that position on the particular path for which there is the greatest degree of certainty that the actual location lies on it. Some examples of criteria which can be used for determining the degree of certainty are agreement with a path definitely used previously, the level of agreement between a direction measured by a sensor and the direction of the digitized path, and the nearness to the measured position. Alternatively, it is possible to determine and save several differences of a measured (sensor) position from the respective possible corresponding positions on different paths.

As a result of the continuous feedback to the calculated position of the difference between calculated and probable position, a reliable determination of position takes place even if the error pattern changes. This is the case, for example, for direction measurement using a gyroscope with an error dependent on the operating temperature.

In accordance with an added feature of the invention, a new sequence of deviations for derivation of a correction value is saved if the deviations in a sequence do not differ among each other by more the standard deviation of a current sequence or by more than a predefined amount.

In accordance with another feature of the invention, a deviation derived as a difference between the calculated position and the corresponding position on the digitized road map is saved, divided by a number of at least one of distances and directions added since deriving a previous difference.

With the above and other objects in view there is also provided, in accordance with the invention, a method of determining a position by dead reckoning, which comprises the following steps:

acquiring measured values for a distance traveled and a direction;

forming vectors from the measured values for the distance traveled and for the direction and summing the vectors with a processor;

determining a difference between a calculated position and a corresponding probable position on a digitized road map and saving the difference as a deviation from the probable position;

calculating a correction value based on chronologically sequential deviations; and adding each correction value to a subsequently calculated position.

In accordance with again an added feature of the invention, the correction value is derived on a basis of the mean of the deviations.

According to a preferred embodiment, a rapid change in the error pattern is not reflected in the correction value. This can be achieved, for example, by defining a limit for the divergence of a new difference from the differences already saved. In this way a recognized difference which is based on an error in the digitalization of the road map is not integrated into the correction value. A similar error can also occur depending on the lane chosen when negotiating curves on wide roads, or in the case that a passenger vehicle fitted with a navigation device is standing at an angle to a road junction and is therefore differently aligned to the road direction according to the digitized road map.

In accordance with again an additional feature of the invention, the chronologically sequential deviations for deriving the correction value are continued to be used until a difference between a position calculated with the correction value and the corresponding probable value on the digitized road map is greater than the previously determined deviation, or is greater than the standard deviation of the sequential deviations, or is greater than a defined magnitude.

In accordance with again another feature of the invention, a correction value is calculated only after a minimum of two consecutive deviations have been determined. A suitable measure for producing a correction value is the standard deviation of the preceding series of saved differences.

In the case of a series of consecutive differences to be saved, time windows or error windows are preferably formed until a new difference to be saved exceeds a defined limit. An attempt is then made to form a new time window or error window for determining a new correction value.

In accordance with again a further feature of the invention, a difference between a calculated position and a probable position corresponding therewith on a digitized road map is calculated each time after one or more additions of vectors, and the deviation to be saved is derived by dividing the difference found by the number of vector additions which have been performed since a preceding comparison with the digitized road map.

In accordance with yet a further feature of the invention, the deviations are separately separately according to magnitude and angle or according to x-direction and y-direction in the cartesian coordinate system.

In accordance with a concomitant feature of the invention, one of several possible positions not yet recognized as a certain corresponding position is selected from the digitized road map as the corresponding probable position.

The navigation device according to the invention and the method according to the invention can also be used in combination with a GPS locator (global positioning system).

Other features which are considered as characteristic for the invention are set forth in the appended claims.

Although the invention is illustrated and described herein as embodied in a navigation device and method for position determination by means of dead reckoning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
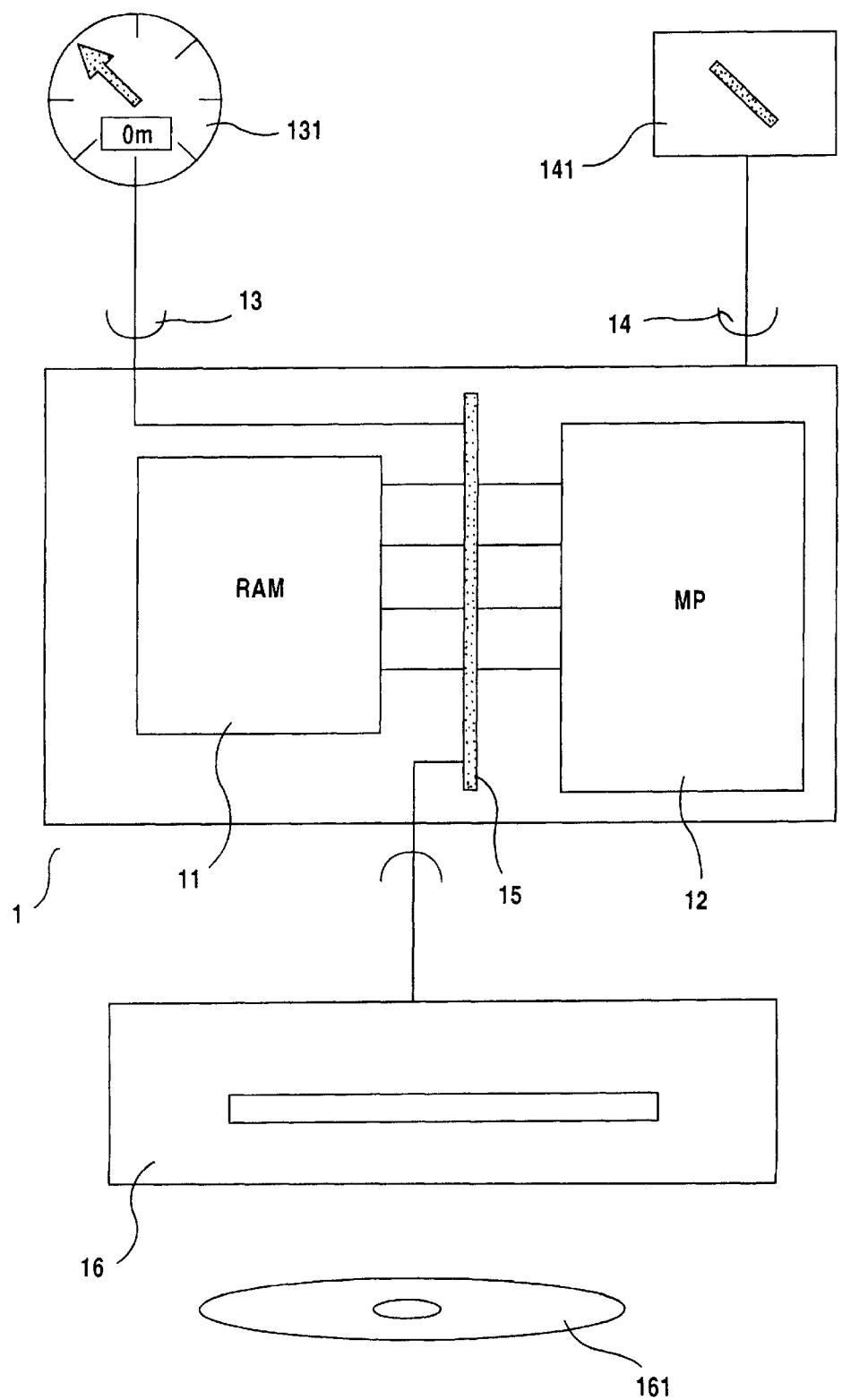
FIG. 1 is a diagrammatic view of a navigation system according to the invention.

Referring now to the figures of the drawing in detail and first, particularly, to FIG. 1 thereof, there is seen a navigation device 1 with a RAM 11 or other volatile memory, a microprocessor 12, an input 13 for a tachometer signal or an odometer 131 and an input 14 for a gyroscope 141 for measuring direction. The input 14 and the gyroscope 141 can also be arranged inside the housing of the navigation device 1.

The RAM 11, the inputs 13, 14 and a mass memory device, which can be formed as a drive 16 for a CD ROM 161 or a DVD (digital versatile disk) are connected with the microprocessor 12 over a system bus 15.

The microprocessor 12 receives a distance signal of the odometer 131 through the input 13 and a direction signal of the gyroscope 141 through the input 14. The signals are measured at short intervals. The respective measured distances and directions stand for vectors which are summed for the purpose of position determination. After one addition or a plurality of additions the calculated position is compared with a probable position on a digitized road map which is stored on the disk 161.

For this purpose the calculated distance covered since the last comparison or since the start, is compared with the distance covered according to the digitized road map. In addition, the calculated alignment of the vehicle is compared with the alignment of the corresponding road on the digitized road map. The differences are each divided by the number of additions of distances or directions added since the comparison. The result of this division is referred to below as deviation.

As a rule, comparison with the digitized road map does not take place for every calculated position. As soon as two comparisons have been made between a calculated position and the digitized road map during a journey, the deviations stored in the memory 11 for the distance and the direction are used to calculate separately the standard deviation $S=+\sqrt{e_1^2 \sqrt{e_2^2}}$ for the distance and the direction, whereby $e_1$, and $e_2$ are the first two deviations determined. In the course of a journey a large number of deviations $e_3$ to $e_n$ can be used in addition for calculating the standard deviation.

The distance traveled or separation according to the digitized map since the last comparison can be determined easily using cartesian coordinates. The distance $$d = \sqrt{[y(t_2) - y(t_1)]^2 + [x(t_2) - x(t_1)]^2} \; ;$$

the corresponding angle $$\varphi = \tan\{[y(t_2) - y(t_1)] \div [x(t_2) - x(t_1)]\},$$

where $x(t_1)$ and $y(t_1)$ are the coordinates of the probable correct position on the digitized road map based on the previous comparison with the calculated position, and $x(t_2)$ and $y(t_2)$ are the coordinates of the probable position on the digitized road map based on the new comparison.

Figure 2:
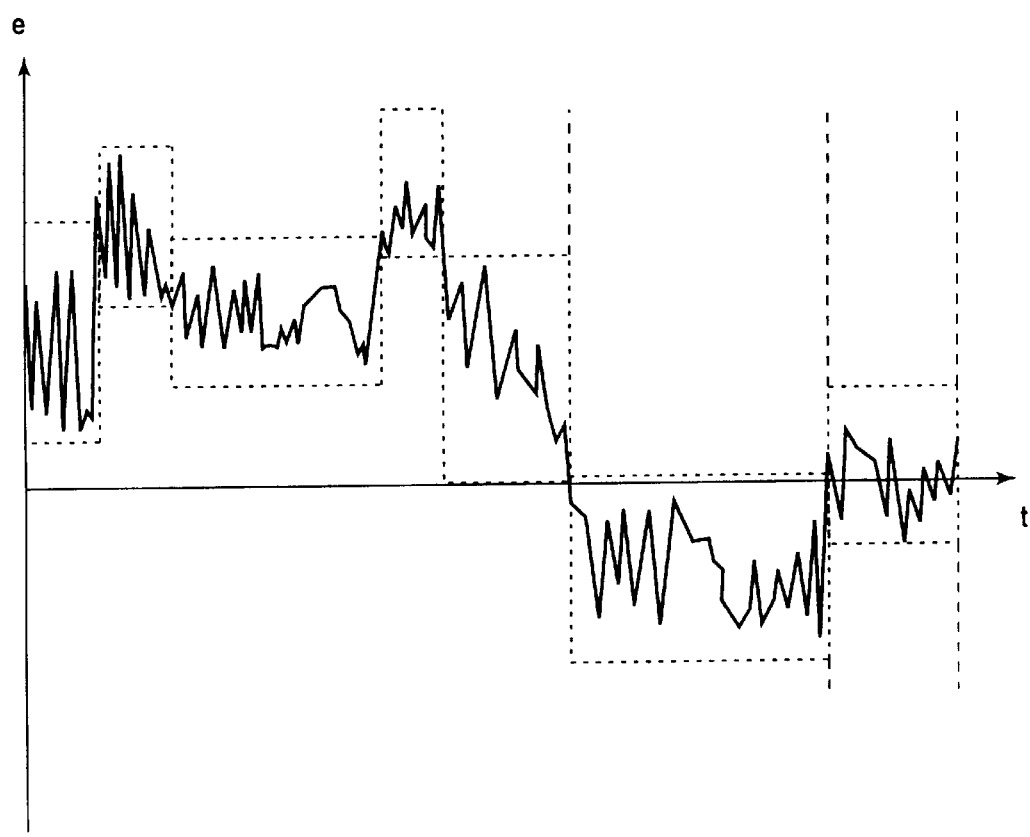
FIG. 2 is a graph illustrating the determination of "error windows."

FIG. 2 shows the chronological sequence of the deviations e relative to the separation from the corresponding probable position on the digitized road map. After the first two deviations have been determined, a mean value is calculated by adding both deviations together and dividing by two. The standard deviation is also calculated. An upper and a lower limit are derived for the continuation of a series of deviations in that the difference between the standard deviation and the mean is calculated. The mean plus this difference is taken as the upper limit and the mean minus the standard deviation is taken as the lower limit.

The mean of the distance deviations is used to correct the next position calculated using dead reckoning, or a number of calculated positions, until the next comparison takes place between a calculated position and a probable position on the digitized road map.

If the newly measured deviation is within the limits established using the standard deviation, the new deviation is saved with the previous deviations and a new mean of the saved deviations and a new standard deviation are calculated. A new upper and lower limit are then calculated on the basis of the new mean and the new standard deviation. The sequential values of the mean are illustrated as a dashed line in the last frame or window.

If a sequence of errors is consistent over a certain length of time, feeding the errors determined back into the calculated position raises step-for-step the precision of the dead reckoning.

If a newly determined deviation is outside the specified limits, the previous sequence of deviations is deleted from the memory 11 and a new sequence of deviations is started as described above.

The process can be refined further through additional criteria. Thus it is reasonable to continue the series of saved deviations despite the fact that a new deviation is outside the defined limits, if the following deviation is back within the limits. The deviation falling outside the frame or window defined by the limits must not be saved.

If the last two deviations were outside the specified limits the previous deviations are deleted from memory and the two new deviations are used for calculating a new standard deviation, new limit values and a new mean, which is used for the error correction process.

Even if a newly determined deviation is within the defined limits, it is still advantageous to delete the previous sequence of deviations from the memory and form a new sequence of deviations if the new deviation and the previous deviation are close to opposite limits. This is the case, for example, if one deviation is less than 20% away from the upper limit and the other deviation is less than 20% away from the lower limit, the percentage calculation being based on the difference between upper and lower limit.

The steps listed above are used not only for distance errors but also in a corresponding way for directional errors.

The system described learns from the previous errors made. In contrast with establishing rigid limit values used to decide whether to continue or terminate a sequence of deviations, the above use of dynamic limits has the advantage that noise can be distinguished from estimable error functionality. The system described can even adapt to a changing error pattern.

I claim:

1. Navigation device for dead reckoning, comprising:
   an input for receiving a distance signal from a sensor for determining a distance;
   an input for receiving a direction signal from a sensor for determining a direction;
   a processor for position calculation based on the distance signal and the direction signal received from the sensors;
   a memory device connected to said processor and having stored therein a digitized road map for comparison with a calculated position;
   a memory connected to said processor for storing a sequence of deviations between each of a series of calculated positions and a corresponding position on the digitized road map;
   said processor being programmed to correct a calculated position using a correction value derived on a basis of the stored sequence of deviations; and
   to save a sequence of deviations for deriving a correction value in the memory until a new deviation to be saved lies outside a defined limit.

2. The navigation device according to claim 1, wherein said processor is programmed to save a new sequence of deviations for derivation of a correction value if the deviations in a sequence do not differ among each other by more the standard deviation of a current sequence or by more than a predefined amount.

3. The navigation device according to claim 1, wherein said processor is programmed to save a deviation derived as a difference between the calculated position and the corresponding position on the digitized road map, divided by a number of at least one of distances and directions added since deriving a previous difference.

4. A method of determining a position by dead reckoning, which comprises the following steps:
   acquiring measured values for a distance traveled and a direction;
   forming vectors from the measured values for the distance traveled and for the direction and summing the vectors with a processor;
   determining a difference between a calculated position and a corresponding probable position on a digitized road map and saving the difference as a deviation from the probable position;
   calculating a correction value based on chronologically sequential deviations;

adding each correction value to a subsequently calculated position; and saving a sequence of deviations for deriving the correction value in the memory until a new deviation to be saved lies outside a defined limit.

5. The method according to claim 4, wherein the calculating step comprises deriving the correction value on a basis of the mean of the deviations.

6. The method according to claim 5, which comprises continuing to use the chronologically sequential deviations for deriving the correction value until a difference between a position calculated with the correction value and the corresponding probable value on the digitized road map is greater than the previously determined deviation, or is greater than the standard deviation of the sequential deviations, or is greater than a defined magnitude.

7. The method according to claim 4, which comprises calculating a correction value only after a minimum of two consecutive deviations have been determined.

8. The method according to claim 4, which comprises determining a difference between a calculated position and a probable position corresponding therewith on a digitized road map each time after one or more additions of vectors, and deriving the deviation to be saved by dividing the difference found by the number of vector additions which have been performed since a preceding comparison with the digitized road map.

9. The method according to claim 4, which comprises saving the deviations separately according to magnitude and angle.

10. The method according to claim 4, which comprises saving the deviations separately according to x-direction and y-direction in the cartesian coordinate system.

11. The method according to claim 4, which comprises selecting as the corresponding probable position from the digitized road map, one of several possible positions not yet recognized as a certain corresponding position.

* * * * *